(12) United States Patent
Amberden et al.

(10) Patent No.: US 8,441,961 B1
(45) Date of Patent: May 14, 2013

(54) METADATA-DRIVEN SWITCH NETWORK CONTROL

(71) Applicants: Bruce M. Amberden, Milpitas, CA (US); Zane M. Taylor, Santa Clara, CA (US)

(72) Inventors: Bruce M. Amberden, Milpitas, CA (US); Zane M. Taylor, Santa Clara, CA (US)

(73) Assignee: Sideband Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/726,491

(22) Filed: Dec. 24, 2012

(51) Int. Cl.
*H04L 12/28* (2006.01)

(52) U.S. Cl.
USPC .............................. 370/254; 370/255; 370/400

(58) Field of Classification Search .................. 370/254, 370/255, 256, 400
See application file for complete search history.

(56) References Cited

U.S. PATENT DOCUMENTS

| | | | |
|---|---|---|---|
| 7,161,904 B2 | 1/2007 | Hussain et al. | |
| 7,174,372 B1 | 2/2007 | Sarkar | |
| 7,222,147 B1 | 5/2007 | Black et al. | |
| 7,280,536 B2 | 10/2007 | Testardi | |
| 7,340,535 B1 | 3/2008 | Alam | |
| 7,411,943 B2 | 8/2008 | Kittredge et al. | |
| 7,522,604 B2 | 4/2009 | Hussain et al. | |
| 7,606,147 B2 | 10/2009 | Luft et al. | |
| 7,668,087 B2 | 2/2010 | Hussain et al. | |
| 7,697,671 B1 | 4/2010 | Duffy | |
| 7,817,549 B1 | 10/2010 | Kasralikar et al. | |
| 8,085,775 B1 | 12/2011 | Pappu et al. | |
| 8,095,488 B1 | 1/2012 | Satish et al. | |
| 8,102,840 B2 | 1/2012 | Kittredge et al. | |
| 8,194,666 B2 | 6/2012 | Davis | |
| 2004/0030766 A1 | 2/2004 | Witkowski | |
| 2005/0089054 A1* | 4/2005 | Ciancaglini et al. | 370/412 |
| 2009/0028192 A1* | 1/2009 | Rieger et al. | 370/535 |
| 2009/0285225 A1 | 11/2009 | Dahod | |
| 2010/0014431 A1 | 1/2010 | Bajpay et al. | |
| 2011/0093849 A1* | 4/2011 | Chawla et al. | 718/1 |
| 2012/0096211 A1 | 4/2012 | Davis et al. | |
| 2012/0120964 A1 | 5/2012 | Koponen et al. | |
| 2012/0147898 A1 | 6/2012 | Koponen et al. | |
| 2012/0158395 A1 | 6/2012 | Hughes et al. | |

FOREIGN PATENT DOCUMENTS

| | | |
|---|---|---|
| EP | 0425203 A2 | 7/1996 |
| WO | 2011/051750 A2 | 5/2011 |

* cited by examiner

*Primary Examiner* — Christopher Grey
(74) *Attorney, Agent, or Firm* — Raj Abhyanker, P.C.

(57) ABSTRACT

Disclosed are systems and methods to automatically and continuously control a switch network using a metadata-driven switch apparatus. In particular, a switch apparatus, comprised of multiple server-grade processors and co-processors coupled with a switch silicon, has a metadata-driven control program running on the switch apparatus to monitor and control the switch apparatus itself and the network traffic running through the switch apparatus. Furthermore, the switch apparatus and metadata-driven control program monitors the network state (health, behavior, and performance) of the entire switch network and receives feedback from the network to improve switch and network controls. The switch network may be composed of one metadata-driven switch apparatus coupled with one or more other metadata-driven switch apparatuses and may also be composed of one metadata-driven switch apparatus coupled with one or more foreign switch apparatuses.

18 Claims, 6 Drawing Sheets

METADATA-DRIVEN SWITCH NETWORK CONTROL

FIELD OF TECHNOLOGY

This disclosure relates generally to networking technology, in one example embodiment, to methods and systems to control a switch network using a metadata-driven switch.

BACKGROUND

The exponential growth of information consumption through mobile computing devices (such as smartphones and tablet computers) has created a greater demand for more robust networking solutions that can handle the traffic from such devices. Broadband and other data providers are rapidly trying to meet client demands for bandwidth but the challenge remains for server-side operations to meet the immense switch networking demands for which enormous datacenters are built. Common switch networking elements of a datacenter may require consistent administrator input to effectively process a flow of data. This flow of data may exceed 100 gigabits per second (GBPS) in some instances.

Common switch networking elements may receive commands from a low-level command line interface (CLI) utilized by a network administrator to reconfigure the switching network in order to process a particular flow of data. However, in datacenters with continuously changing types of data and where data arrives from an ever changing landscape of locales, the repeated process of reconfiguring through administrator inputs may be cumbersome and result in extended network outages and delays. These standardized vendor switches may require complex proprietary application programming interfaces (APIs) and may be inflexible and static in application and configuration.

SUMMARY

Disclosed are systems and methods to automatically and continuously control a switch network using a metadata-driven switch. In particular, a switch apparatus, comprised of multiple server-grade processors and co-processors coupled with a switch silicon, has a metadata-driven control program running on the switch apparatus to monitor and control the switch apparatus itself and the network traffic running through the switch apparatus. Furthermore, the switch apparatus and metadata-driven control program monitors the network state (health, behavior, and performance) of the entire switch network and receives feedback from the network to improve switch and network controls. The switch network (also known as a switch fabric) may be composed of one metadata-driven switch apparatus coupled with one or more other metadata-driven switch apparatuses and may also be composed of one metadata-driven switch apparatus coupled with one or more foreign switch apparatuses. Multiple metadata-driven switches on the network may share the workload of managing the network.

The metadata-driven control program is a metadata switch control engine constructed using metadata programming methods. The metadata switch control engine utilizes dynamic metadata models of multiple metadata-driven switches, foreign switches, the entire switch network, and network traffic in combination with a scheduler to make real-time changes to network configurations in response to changing network traffic patterns. Network traffic feedback monitoring may be accomplished by setting multiple flow sensing points (or flow sensors) on the switch (and switch network) to collect packets, which are sent to one or more deep-packet inspection (DPI) engines for analysis. Results of the analysis may be forwarded to one or more action methods in a control loop action list where the results are classified and applied to issue metadata control commands. Metadata control commands (or metadata commands) may be collected by the scheduler and sent to a hierarchical metadata controller that expands such commands into low-level switch control actions. Such switch control actions may be directed to the switch apparatus itself, directed to other remote metadata-driven switches, or directed to foreign switches.

The objective is to robustly automate the dynamic management of complex network configurations under heavy traffic loads with minimal operation guidance. The distributed metadata-driven control system will monitor network health, behavior, and performance moment-to-moment and make configuration changes to eliminate problems and bottlenecks.

In addition, the metadata-driven switch apparatus and process engine may run a number of network application endpoints that manage virtual secure channels and provide protected, authenticated, and authorized access between end users and service providers.

The metadata switch control engine (also referred to as the metadata-driven switch engine) may be analogized to an autopilot on a fighter jet plane—able to fly the plane and accomplish mission goals with minimal pilot (e.g., network administrator) input. Like the autopilot, the metadata-driven switch engine can send out thousands, millions, or billions of switch control actions per second to manage the state of the switch network or fabric in real-time to accomplish network service objectives.

In one aspect of the claimed invention, a machine-implemented method to automatically and continuously control a switch network using metadata comprises: running a schedule loop at a high rate of repetition using a scheduler, where the schedule loop runs through an action list of methods; executing one or more action methods from the action list; passing a metadata command down a metadata command hierarchy in response to the action method executed; and reconfiguring the switch network in response to the metadata command. The switch network comprises a switch configuration of a single metadata-driven switch or a switch configuration of the single metadata-driven switch communicatively coupled to one or more foreign switches or one or more remote metadata-driven switches.

In this aspect, the action list includes one or more static action methods, dynamic action methods, virtual secure channel methods, DPI response action methods, and remote metadata-driven switch action methods. The method also includes performing a deep packet inspection (DPI) of a packet or a packet flow and communicating the results of the DPI to the DPI response action method where the DPI is performed on one or more off load engines and wherein at least one of the plurality of off load engines is coupled to a switch silicon communicatively coupled to the switch network. Additionally, the method involves passing the metadata command down the metadata command hierarchy through a hierarchical metadata controller executable on one or more off load engines of the single metadata-driven switch.

In this aspect, the metadata command hierarchy may be a series of expanding command structures and the hierarchical metadata controller may receive the action from the action list at a command structure other than a top level command structure. Moreover, the series of expanding command structures may have direct access to one or more metadata switch models of the single metadata-driven switch, one or more metadata network models of the plurality of switches (each composed of a network traffic model that establishes how traffic should be routed through a network), one or more foreign switch models, and one or more ad-hoc settings.

The method may further comprise, in no particular order, reconfiguring the single metadata-driven switch by passing the metadata command to an open source switch application programming interface (API); reconfiguring one or more remote metadata-driven switches communicatively coupled to the single metadata-driven switch by passing the metadata command to a remote metadata-driven switch API; and reconfiguring one or more foreign switches communicatively coupled to the single metadata-driven switch by passing the metadata command to a foreign switch API. Furthermore, the foreign switch or the remote metadata-driven switch communicatively coupled to the switch network may be reconfigured through a virtual secure channel.

In addition, when more than one metadata-driven switch is coupled to the switch network, the method may include delivering a complete copy of a pre-existing switch environment to a new metadata-driven switch added to the switch network through a metadata-driven switch-to-switch protocol. Finally, the method may include reporting a result of one or more action methods, metadata commands, and reconfigurations of the switch network to a network administrator through a web user interface.

Another aspect of the claimed invention involves a switch system comprising: a single metadata-driven switch and a plurality of switches, wherein the plurality of switches comprise either one or more foreign switches or one or more remote metadata-driven switches. The single metadata-driven switch has embedded in its switch architecture one or more off load engines, one or more processors (or co-processors), and one or more storage devices communicatively coupled to the one or more off load engines and co-processors. Finally, a plurality of programs is stored in the one or more storage devices, and is executable by the one or more off load engines and co-processors. At least one of the plurality of programs comprise: instructions to run a schedule loop at a high rate of repetition using a scheduler, where the schedule loop runs through an action list of methods; instructions to execute one or more action methods from the action list; instructions to pass a metadata command down a metadata command hierarchy in response to the action method executed; and instructions to reconfigure a switch network in response to the metadata command. In this aspect, the switch network comprises a switch configuration of the single metadata-driven switch or a switch configuration of the single metadata-driven switch communicatively coupled to one or more foreign switches or one or more remote metadata-driven switches.

Similar to the above method, the action list comprises one or more static action methods, dynamic action methods, virtual secure channel methods, DPI response action methods, and remote metadata-driven switch action methods. Similarly, the single metadata-driven switch may comprise a program with instructions to perform a deep packet inspection (DPI) of a packet or a packet flow and communicate the results of the DPI to the DPI response action method. The DPI may be performed on one or more off load engines and at least one of the one or more off load engines may be coupled to a switch silicon communicatively coupled to the switch network.

Similarly, the single metadata-driven switch may comprise a program with instructions to pass the metadata command down the metadata command hierarchy through a hierarchical metadata controller executable on one or more off load engines of the single metadata-driven switch. As indicated above, the metadata command hierarchy may be a series of expanding command structures and the hierarchical metadata controller may receive the action from the action list at a command structure other than a top level command structure. Furthermore, the series of expanding command structures may have direct access to one or more metadata switch models of the single metadata-driven switch, one or more metadata network models of the plurality of switches (each composed of a network traffic model that establishes how traffic should be routed through a network), one or more foreign switch models, and one or more ad-hoc settings.

Similarly, the single metadata-driven switch may comprise a program with instructions to reconfigure the single metadata-driven switch by passing the metadata command to an open source switch application programming interface (API); instructions to reconfigure one or more remote metadata-driven communicatively coupled to the single metadata-driven switch by passing the metadata command to a remote metadata-driven switch API; and instructions to reconfigure one or more foreign switches communicatively coupled to the single metadata-driven switch by passing the metadata command to a foreign switch API. Furthermore, the foreign switch or a remote metadata-driven switch communicatively coupled to the switch network may be reconfigured through a virtual secure channel.

Additionally, the single metadata-driven switch may comprise a program with instructions to deliver a complete copy of a pre-existing switch environment to a new metadata-driven switch added to the switch network through a switch-to-switch protocol and a program with instructions to report a result of one or more action methods, metadata commands, and reconfigurations of the switch network to a network administrator through a web user interface.

The methods and systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

Other features of the present embodiments will be apparent from the accompanying drawings and from the detailed description that follows.

DETAILED DESCRIPTION

Disclosed are methods and systems to control a switch network using a metadata-driven switch. Although the present embodiments have been described with reference to specific example embodiments, it will be evident that various modifications and changes may be made to these embodiments without departing from the broader spirit and scope of the various embodiments. It should be understood by one of ordinary skill in the art that the terms "application(s)," "program(s)," "software," "software code," "sub-program(s)," "module(s)," and "block(s)" are industry terms that refer to computing instructions stored in memory and executable by a processor.

Figure 1:
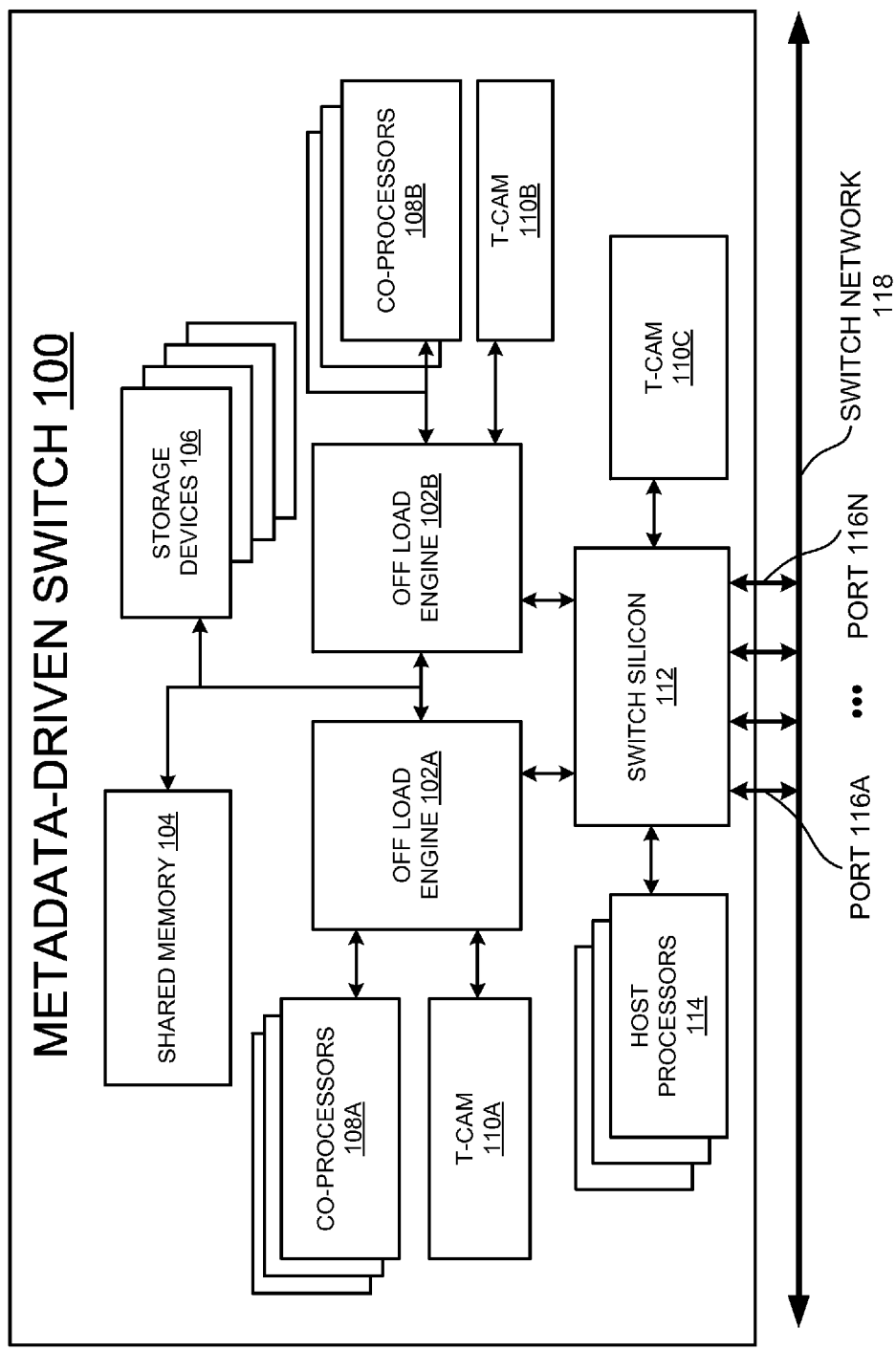
FIG. 1 illustrates a block diagram of a metadata-driven switch used to control a switch network, according to one or more embodiments.

Reference is now made to FIG. 1, which illustrates a block diagram of a metadata-driven switch 100 used to control a switch network 118 through metadata commands. In one or more embodiments, the metadata-driven switch 100 comprises one or more off load engines coupled to one or more co-processors. In one or more embodiments, an off load engine may be a server grade processor (e.g., a processor comprising at least 8 cores and operating at a minimum clock speed of 1.8 gigahertz (GHz)). The co-processors may be additional off load engines (or a processor with equivalent processor power) and may take on processing duties when the primary off load engines (off load engines 102A and 102B) are overloaded. It should be understood by one of ordinary skill in the art that the terms off load engine and co-processors are industry terms that refer to computing processors in a physical network switch.

In the example embodiment shown in FIG. 1, the metadata-driven switch 100 comprises off load engine 102A and off load engine 102B. In this embodiment, off load engine 102A is coupled to one or more co-processors 108A and off load engine 102B is coupled to one or more co-processors 108B. In this same embodiment, the off load engine 102A may also be coupled to a ternary content addressable memory (T-CAM) 110A and the off load engine 102B may also be coupled to another T-CAM 110B. A T-CAM refers to a form of high-speed memory hardwired with low-level computing applications or programs. The T-CAM may comprise of both volatile and non-volatile memory. While the most commonly implemented CAMs are known as binary CAMs. Such components only search for ones and zeros. A T-CAM allows the processor to access a third state, or "X" state. The X state may be a "mask," meaning its value may be anything. This additional capability is especially useful for networking operations because when calculating a subnet address, bits are first masked and then logical operations are performed on the rest of the data packet. A network switch may store entire routing tables in T-CAM for easy lookup. In one embodiment, each off load engine embedded in the metadata-driven switch 100 may have one or more T-CAMs coupled to the off load engine. In this same embodiment, one or more T-CAMs (for example, T-CAM 110C in FIG. 1) may store re-writable or upgradeable microcode that may be used to instruct a switch silicon 112 by translating machine instructions into sequences of circuit-level operations.

Both off load engines 102A and 102B may also be coupled to a shared memory 104, which, in turn, may be coupled to one or more storage devices 106. Shared memory 104 may be any form of non-volatile random access memory (NVRAM) in combination with dynamic random access memory (DRAM) embedded in the metadata-driven switch 100. The shared memory 104 may be used to temporarily store data that the one or more off load engines or co-processors are using for an operation.

Both off load engines 102A and 102B may also be coupled to the switch silicon 112, which may, itself, be coupled to one or more host processors 114. It is understood by one of ordinary skill in the art that a switch silicon refers to a switch chip capable of routing network traffic. In one embodiment, the switch silicon 112 is any switch chip with at least 64 ports and a minimum aggregate bandwidth throughput of 640 gigabits per second (GBPS). The one or more host processors 114 may be used to operate the switch silicon 112.

The entire metadata-driven switch 100 may be communicatively coupled to a switch network 118 through one or more ports 116A-N connecting the switch's switch silicon 112 with the switch network 118. All such components of the metadata-driven switch 100 may be coupled or connected by high-speed buses shown as solid arrowed lines in FIG. 1.

Although the present embodiments have been described with reference to a single metadata-driven switch, it will be evident that various modifications and changes may be made to these embodiments without departing from the broader spirit and scope of the various embodiments. For example, multiple metadata-driven switches may be communicatively coupled to one another or to non-metadata-driven switches (referred to here as foreign switches) to form a switch system. As will be made apparent in FIG. 2, the same metadata-driven switch engine 200 used to control a single metadata-driven switch 100 may also be used to control one or more other metadata-driven switches (referred to here as remote metadata-driven switches) and one or more foreign switches communicatively coupled to the single metadata-driven switch 100.

Figure 2:
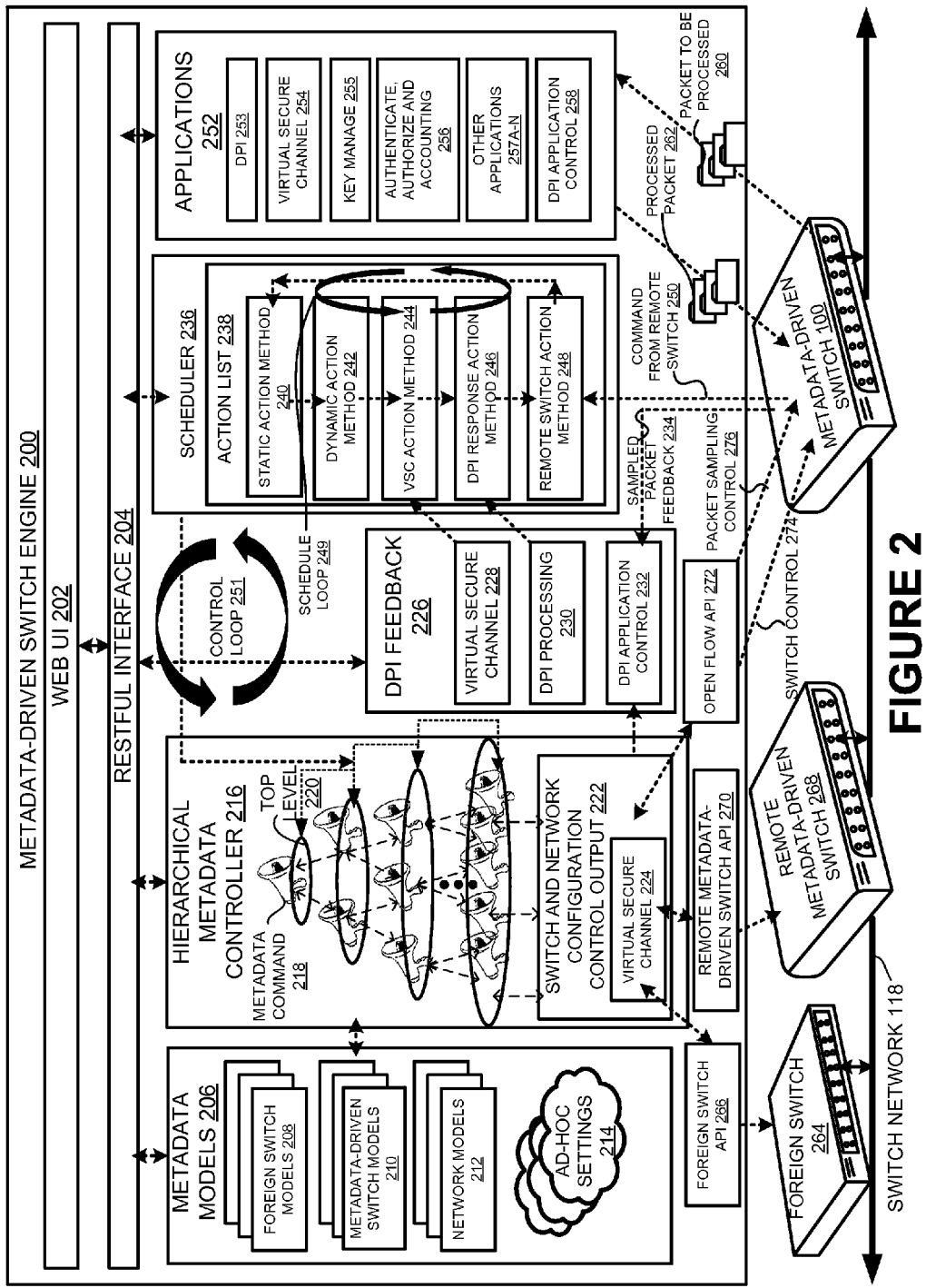
FIG. 2 illustrates a metadata-driven switch engine running on the metadata-driven switch of FIG. 1, according to one or more embodiments.

Reference is now made to FIG. 2, which illustrates a metadata-driven switch engine 200 running on the metadata-driven switch 100 of FIG. 1 and used to control the switch network 118. The switch network 118 may comprise a switch configuration of a single metadata-driven switch 100 or a switch configuration of the single metadata-driven switch 100 communicatively coupled to one or more foreign switches or one or more remote metadata-driven switches 268. The metadata-driven switch engine 200 is a set of software instructions or programs stored in one or more of the storage devices 106, shared memory 104, or T-CAM 110 of FIG. 1 and executable on one or more off load engines (for example, off load engines 102A and 102B) or one or more co-processors 108. It should be understood by one of ordinary skill in the art that metadata models 206, hierarchical metadata controller 216, DPI feedback 226, scheduler 236, and applications 252 may be software modules, blocks, or sub-programs stored on any of the memory or storage devices previously discussed above (and copied into shared memory 104 when appropriate) and may be executable by any one of the off-load engines 102, co-processors 108, or host processors 114.

As can be seen in FIG. 2, a scheduler 236 runs a schedule loop 249 at a high rate of repetition or at potentially real-time rates (meaning that the scheduler 236 runs at megahertz (MHz) or GHz rates to mimic the real time operation of the metadata-driven switch 100). In one embodiment, the scheduler's schedule loop 249 runs continuously through an action list 238 of action methods and executes one or more of the action methods from the action list. It is important to note that one of the action methods may be a null method, meaning that the scheduler 236 may run through the action list 238 without executing any action methods. The scheduler 236 may be stored initially in on or more storage devices 106 and may be copied into the shared memory 104 when being executed by the off load engine 102.

In the example embodiment depicted in FIG. 2, the action list 238 comprises one or more static action methods 240, dynamic action methods 242, virtual secure channel (VSC) action methods 244, deep-packet inspection (DPI) action methods 246, and remote switch action methods 248. Each action method may be a function called by the scheduler 236.

Each action method block may represent one function or a collection of functions. The static function methods 240 may be a set of functions that are called every time the scheduler 236 undertakes a schedule loop 249. Such functions or action methods may include low-level maintenance of the switch or reporting the status of switch to the network administrator 302. The dynamic action methods 242 may be a set of functions that are turned on and off depending on the current status of the switch. For example, if a port 116 has failed mechanically, a function or action method may be called to route all traffic from that particular port to a different port. The VSC action method 244 block, the DPI response action method 245 block, and the remote switch action method 248 block will be discussed in various sections below.

In response to an action method executed, the scheduler 236 sends a processed metadata command 218 to a hierarchical metadata controller 216. The hierarchical metadata controller 216 then passes the metadata command 218 down a metadata command hierarchy. This metadata command hierarchy may be a series of expanding command structures and the hierarchical metadata controller 216 may receive an action or command from the schedule at a top level 220 command structure or a command structure level other than the top level 220. The hierarchical metadata controller 216 may be stored in the storage devices 106 initially and may be copied into the shared memory 104 when being executed by one or more of the off load engines 102.

Additionally, the hierarchical metadata controller 216 may have bi-directional access to one or more metadata models 206. This means that the hierarchical metadata controller 216 may read information out of the metadata models 206 while the hierarchical metadata controller 216 is executing its metadata command 218 and information may be read back to the metadata models 206 to revise and update one or more of the metadata models 206 to reflect the current configuration of the switch network 118. The metadata models 206 comprises one or more foreign switch models 208, one or more metadata-driven switch models 210, one or more network models 212 (each composed of a network traffic model that establishes how traffic should be routed through a network), and one or more ad-hoc settings 214 or ad-hoc network settings. The metadata models 206 may be stored in one or more storage devices 106 initially and copied into shared memory 104 when being executed by a processor.

All such models and settings are constructed from metadata and characterize one or more switch configurations that a switch can take. For example, each metadata-driven switch model 210 is constructed from metadata and is reflective of a potentially live switch configuration that the metadata-driven switch 100 can take. In addition, each foreign switch model 208 is also constructed from metadata and is reflective of a potentially live switch configuration that a foreign switch (for example, foreign switch 264 as depicted in FIG. 2) communicatively coupled to one or more metadata-driven switches 100 can take. Finally, each network model is constructed of metadata and is reflective of an overall network traffic model comprising a plurality of metadata-driven switches 100 or one metadata-driven switch 100 and one or more foreign switches 264. Using metadata to model switch and network configurations allow the metadata-driven switch engine 200 to rapidly and efficiently switch between multiple and numerous switch configurations and ensures fine-grained network control. For example, the hierarchical metadata controller 216 may instruct the metadata-driven switch 100 to switch from switch configuration A to switch configuration B by issuing a metadata command 218 to adopt metadata-driven switch model 210B as the live switch model. Using this method, the switch's configuration changes quicker than if a new switch configuration must be conceived and implemented by the switch's processor after receiving a traditional switch command.

After receiving a metadata command 218, the hierarchical metadata controller 216 passes the metadata command 218 down the metadata command hierarchy by expanding the command at each lower command structure level. By doing so, a simple metadata command 218 received at the top of the metadata command hierarchy may trickle down into a multitude of more complex or detailed commands that are passed as commands to low-level APIs to instruct the actual switch silicon to adopt a new switch configuration or a new network configuration through the switch and network configuration control output 222. The switch or network configurations chosen may be based on any of the previously discussed foreign switch models 208, the metadata-driven switch models 210, or the network models 212 (which are each composed of a network traffic model that establishes how traffic should be routed through a network).

Additionally, the metadata-driven switch engine 200 may adopt one of the ad-hoc settings 214. Such settings may be additional switch settings that do not reside within a switch model or additional network settings that do not reside within any of the switches in a switch network.

In one embodiment, if the hierarchical metadata controller 216 passes a command to the same metadata-driven switch 100 on which the controller is resident, it will output a switch control 274 command from the switch and network configuration control output 222 to its switch silicon 112 directly through an open source switch API. One example of such an open source switch API is the OpenFlow interface (depicted in FIG. 2 as Open Flow API 272) and described in more detail at http://www.openflowswitch.org. The OpenFlow API 272, the remote metadata-driven switch API 270, and the foreign switch API 266 may be stored in T-CAM 110C, which may be coupled directly to the switch silicon 112, and executable by one or more of the host processors 114.

In this same embodiment, if the hierarchical metadata controller 216 generates a command for a different metadata-driven switch that is not the same metadata-driven switch 100 on which the controller is resident (referred to here as a remote metadata-driven switch 268), it will interface with the remote metadata-driven switch 268 through a virtual secure channel 224 protocol running as part of the switch and network configuration control output 222. Additionally, the hierarchical metadata controller 216 may send the low level switch command through the virtual secure channel 224 to a remote metadata-driven switch API 270. The remote metadata-driven switch API 270 may then instruct the metadata-driven switch engine running on the remote switch to adopt one or more metadata-driven switch models stored in its memory.

Finally, if the hierarchical metadata controller 216 generates a command for one or more foreign switches 264, it may interface with the foreign switch 264 through a foreign switch API 266 that may send lines of software code to the foreign switch 264 in its native programming language. Communications with both foreign switches 264 and remote metadata-driven switches 268 are transacted through the virtual secure channel 224 to ensure the security of resources sent to and received from such switches. For example, the virtual secure channel 224 protocol to one or more foreign switches 264 may involve the exchange of encrypted software token (ESTs). At this juncture, it is important to point out that the remote metadata-driven switch 268 refers to any metadata-driven switch 100 that is not the metadata-driven switch 100 running the metadata-driven switch engine 200 and implementing the switch control 274 command at present.

Moreover, since all metadata-driven switches of this switch system run a copy of the same metadata-driven switch engine 200, the distinction between remote metadata-driven switch 268 and metadata-driven switch 100 is simply a matter of perspective. With that said, since each metadata-driven switch 100 runs a copy of the metadata-driven switch engine 200, a network of such switches allow control of the switch network to be distributed over multiple metadata-driven switches so that if any such switch fails or is compromised by a threat agent, another switch can take over essential switch control functions without delay. Therefore, adding additional metadata-driven switches to the switch network offers the network with more redundancy, more fault tolerance, and more overall processing power for tasks such as DPI.

A metadata-driven switch receiving a command from another metadata-driven switch (or a remote metadata-driven switch) first sends the command (depicted in FIG. 2 as command from remote switch 250) to the remote switch action method 248 block before it can be acted on by the scheduler 236 and, eventually, the hierarchical metadata controller 216. The remote switch action method 248 block analyzes any commands received from the remote metadata-driven switch 268 and makes a determination whether the command is allowable before sending the command to the hierarchical metadata controller 216.

In fact, FIG. 2 also depicts how the meta-driven switch engine 200 may be leveraged to continuously monitor the state of a switch network through DPI feedback. As indicated in FIG. 2, a DPI engine (shown here as DPI feedback 226) comprises a DPI processing 230 block and a DPI application control 232 block. In one embodiment, the DPI feedback 226 block or sub-program may be stored in the storage devices 106 (and copied into shared memory 104 when appropriate) and executable by a dedicated off load engine (such as off load engine 102A). In another embodiment, the DPI feedback 226 block or sub-program may be stored in the storage devices 106 (and copied into shared memory 104 when appropriate) and executable by one or more co-processors 108.

The DPI application control 232 block receives feedback from a variety of flow sensors established throughout switching nodes in the switch network. The flow sensor may sense information regarding a packet or information regarding a flow of packets. The information from such flow sensors may be first sent to the DPI application control 232 block and then processed by the DPI processing 230 block. The DPI processing 230 block may then perform a deep packet inspection of one or more packets or one or more packet flows sampled from the flow sensors and communicate the results of the DPI through either the DPI processing 230 block or one or more virtual secure channels. If the packets inspected are encrypted packets, the result of such an inspection may be communicated to the VSC action method 244 block through one or more virtual secure channels (for example, virtual secure channel 228). If the packets inspected are non-encrypted packets, the result of such an inspection may be communicated to the DPI response action method 246 directly. Both the VSC action method 244 block and the DPI response action method 246 block may comprise a collection of functions that may be called in response to a result gleaned from DPI feedback 226. Such functions may instruct the metadata-driven switch 100 to route traffic to different ports or to drop or sequester certain packets or packet flows that pose a threat to the switch network 118.

In one example embodiment, several DPI processing methods may be stored in the DPI processing 230 block and different DPI processing methods may be communicated to the DPI response action method 246 block to be executed by the scheduler 236. In one embodiment, the deep packet inspection is performed on at least one of the off load engines 102A and 102B communicatively coupled to the switch silicon 112.

By doing so, the metadata-driven switch engine 200 establishes an overall control loop (depicted in FIG. 2 as control loop 251) where feedback from DPI is one of the factors that instigate changes to a switch network. For example, as depicted in FIG. 2, feedback is first collected from the metadata-driven switch 100, then processed by the DPI engine (DPI feedback 226) and communicated to the scheduler 236. Metadata commands in response to such feedback are then communicated to the hierarchical metadata controller 216, which then passes a packet sampling control 276 command back down to the metadata-driven switch 100 through the OpenFlow API 272. Such packet sampling control commands may include a command to adopt a new flow sensor configuration or a new mechanism for collecting flow information.

Alternatively, the scheduler 236 may also receive commands from remote metadata-driven switches or from foreign switches. The responses to such feedback are communicated as action methods to the scheduler 236 via one or more virtual secure channels. Since the scheduler 236 continuously and automatically loops through its action list 238 at MHz to GHz rates, the configuration of the metadata-driven switch 100, the configuration of the switch network 118 (which may include both foreign switches 264 and remote metadata-driven switches 268), and the models stored in the metadata models 206 are continuously updated to take into account new feedback.

Finally, the metadata-driven switch 100 may send a data packet to be processed 260 to one or more on-switch applications 252 stored in one or more storage devices 106 of the metadata-driven switch 100 (and copied into shared memory 104 when appropriate) and executable by one or more of the co-processors 108. As depicted in FIG. 2, the applications may include a deep-packet inspection (DPI) 253 application, an application that establishes a virtual secure channel 254, a key management application 255, an authentication, authorization, and accounting 256 application, a DPI application control 258 and other applications 257A-N. Examples of other applications 257A-N may include security protocols to securely route traffic from financial institutions and to analyze data packets received from such institutions. Another example of other applications 257A-N may include security protocols to securely route enterprise traffic from client devices used by employees of an enterprise.

The DPI 253 application may be additional DPI processes not covered by the DPI feedback 226 sub-program. One or more of the applications 252 may process a packet and send the processed packet 262 back to the metadata-driven switch 100 to be delivered to its intended destination. One example of such an application is the virtual secure channel 254 application, which may be used to open one or more virtual secure channels to an enclave device coupled to a client device (e.g., a smartphone or computer). Additionally, the key manage 255 block and the authenticate, authorize, and accounting 256 block may also be used to exchange ESTs with one or more devices communicating with a metadata-driven switch 100 or a foreign switch 264 communicatively coupled to the metadata-driven switch 100. Such an application allows the metadata-driven switch 100 to perform a security function in addition to a switching function.

One or more such on-switch applications 252 may be stored in one or more storage devices 106 (and copied into shared memory 104 when appropriate) and executed by the one or more co-processors 108.

Throughout this entire process, a user (such as a network administrator 302, see FIG. 3) may view or control any components of the metadata-driven switch engine 200 through a web user interface (UI) 202. The web UI 202 allows the network administrator 302 to examine the state of the network or the state of any network traffic. In one embodiment, the web UI 202 may interface with any of the metadata models 206, the hierarchical metadata controller 216, the DPI feedback 226, the scheduler 236, or the applications 252. For example, the network administrator 302 may examine how the hierarchical metadata controller 216 is set up and what happens when a metadata command 218 is passed down and expanded through the metadata command hierarchy using the web UI 202. Additionally, the network administrator may input a command directly to the hierarchical metadata controller 216 without going through the scheduler 236. Similarly, a network administrator 302 may add a model to any of the metadata models 206 and may revise any of the models stored in the metadata models 206 block. Furthermore, a network administrator 302 may examine the setup of the scheduler 236 and add actions to the action list 238 through the web UI 202.

The web UI 202 interfaces with the switch engine's sub-programs through a RESTful interface 204. This interface is based on the Representational State Transfer (REST, also known as RESTful) software architecture style which relies on an HTTP or HTTPS protocol to give users access to remote data and remote resources. In another embodiment not shown in FIG. 2, the web UI 202 may interface directly with the plurality of sub-programs without going through the RESTful interface 204. In one embodiment, the web UI 202 comprises of web pages or web applications that display the results of all sub-programs included in the metadata-driven switch engine 200 and allow the user to input commands directed at each of the sub-programs. One or more offload engines 102 may also run an Apache web server (or some other web server), for example, to allow client devices access to the metadata-driven switch 100.

Figure 3:
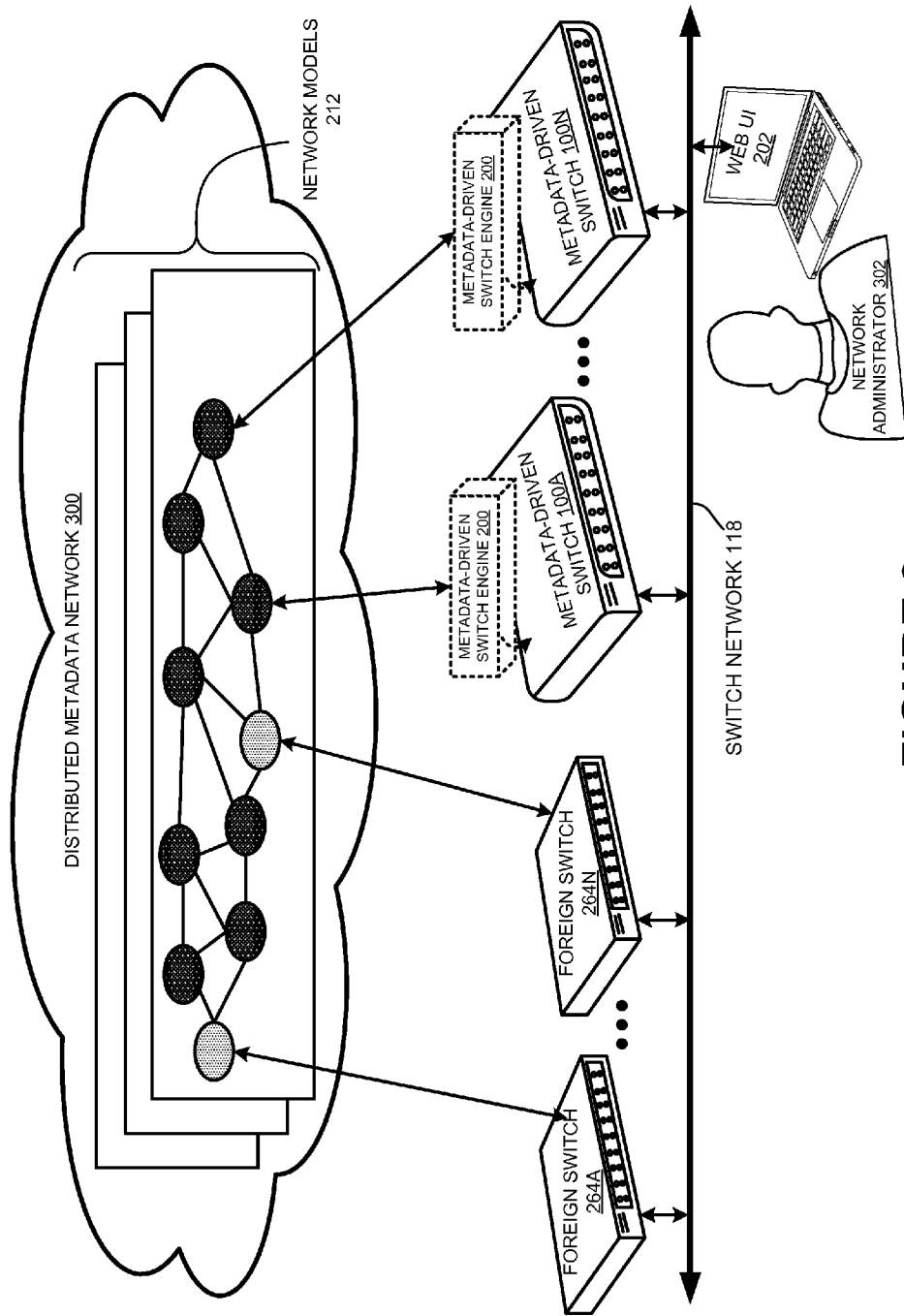
FIG. 3 illustrates a distributed metadata network, according to one or more embodiments.

Reference is now made to FIG. 3, which illustrates a distributed metadata network 300 according to one or more embodiments. As indicated above, all of the metadata-driven switches (metadata-driven switch 100A-N) are running the metadata-driven switch engine 200. Additionally, as described above, a metadata-driven switch engine 200 considers a metadata-driven switch that is not the switch on which its program is currently running as a remote metadata-driven switch 268. As indicated in FIG. 3, a network of such switches (switch network 118) allows control of the network to be distributed over multiple metadata-driven switches so that if any such switch fails or is compromised by a threat agent, another switch can take over essential switch control functions without delay. This allows the network to be run as a distributed metadata network 300 using, essentially, a single metadata-driven switch engine 200.

In one embodiment, a network model 212 may be established where one metadata-driven switch 100 acts as the master switch and all other switches on the switch network 118 act as the slave to the master switch. In another embodiment, a network model 212 may be established where control is distributed evenly over multiple meta-driven switches 100A-N and decisions are made by factoring in commands from all switches. Finally, in a further embodiment, a network model 212 may be established as a tree structure where one metadata-driven switch 100 delivers commands to only a few metadata-driven switches, which may, in turn, deliver commands to more switches in the switch network 118. All such network models 212 also comprise network traffic models that establish how traffic should be routed through a network.

The network administrator 302 may choose the appropriate network model 212 by inputting a network control command through the web UI 202.

Moreover, a complete copy of the pre-existing switch environment (the metadata-driven switch engine 200) may be delivered to a new metadata-driven switch added to the switch network 118 through a metadata-driven switch-to-switch protocol. In one embodiment, this switch-to-switch protocol is the remote metadata-driven switch API 270. As shown in FIG. 3, the switch network 118 may also comprise foreign switches 264A-N. A switch network comprising of just one metadata-driven switch 100 may control a plurality of foreign switches 264A-N simply by sending switch commands through the foreign switch API 266.

When new switches are added to the switch network 118, the metadata-driven switch engine 200 adds new network models 212 to the metadata models 206 block and the number of network models 212 grows by accretion.

Figure 4:
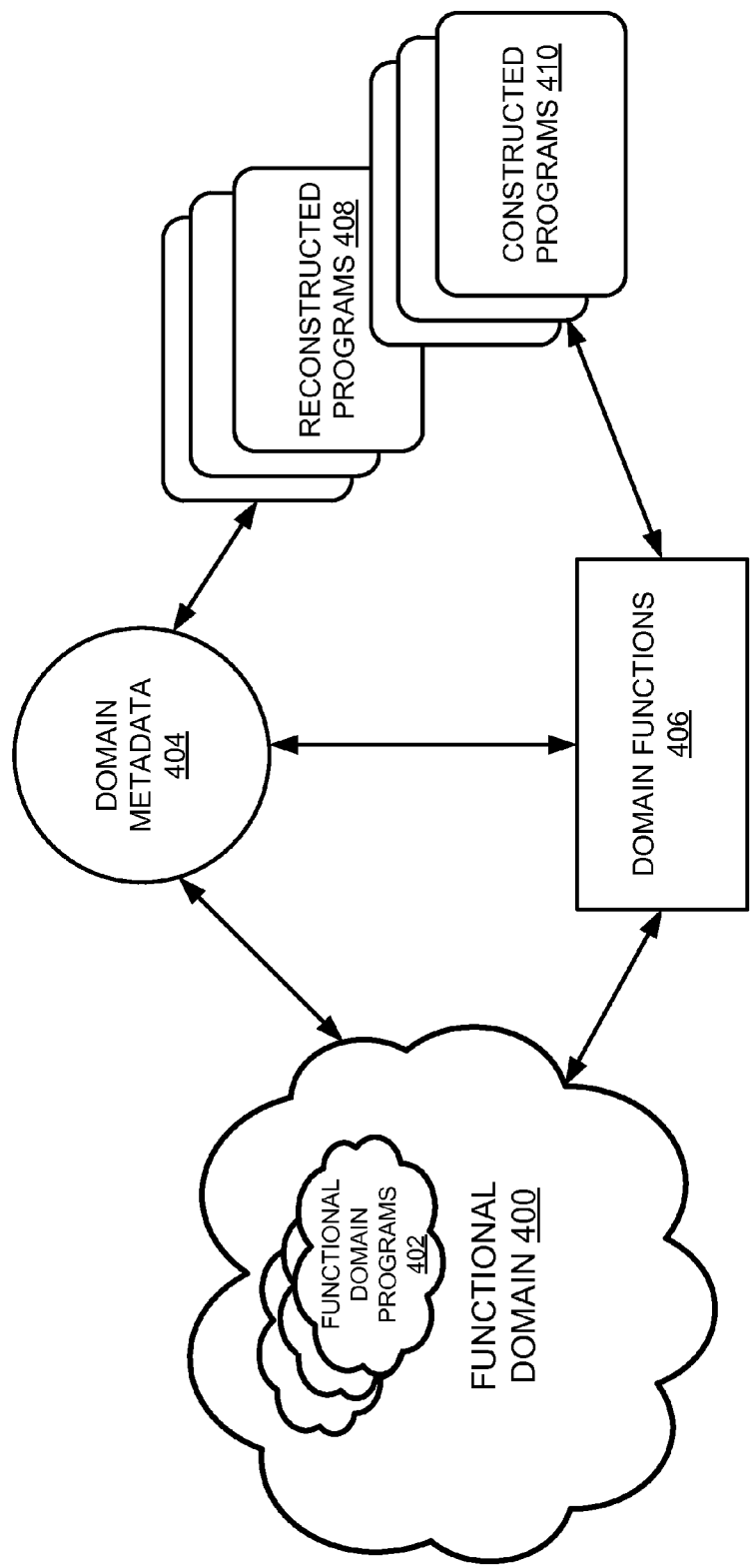
FIG. 4 is a schematic representation of a metadata framework used to construct the metadata-driven switch engine of FIG. 2, according to one or more embodiments.

Reference is now made to FIG. 4, which is a schematic representation of a metadata framework used to construct the metadata-driven switch engine of FIG. 2 according to one or more embodiments. While one traditional definition of "metadata" is "data about data," the claimed invention refers to metadata much more broadly, as "data about everything." For example, metadata is used in the claimed invention to annotate: data, states of data (or simply, states), functions involving data (or simply, functions), and processes involving data (where a process may also represent the behavior of a state). Thus, a collection of metadata may be used to annotate and index any number of simple to complex "things." And any simple to complex things may be decomposed and indexed using metadata. When used to index a thing and its components, the metadata index may be considered a model of that thing and can capture the thing's behavior.

Since software may be defined as an organized collection of data and instructions, software may also be treated as a "thing" that can be indexed (or decomposed) using metadata. A more object-oriented definition of software is that software are procedures built using objects, which are further composed of states and methods (or functions for manipulating states). In other words, a state is simply structured data and methods or procedures are lower to higher-level organized collections of instructions.

New metadata software models may be easily (and quickly) built (or composed) using the software's metadata annotations and any metadata software model may become metadata primitives in a higher level metadata "domain" or "functional domain" (thereby allowing metadata to describe other metadata). From a software perspective, a functional domain 400 identifies a function state or function space upon which programs (also called functional domain programs 402) can be expressed. A typical program will employ elements from multiple functional domains 400. A functional domain 400 can be decomposed into a set of domain states and functions (depicted in FIG. 4 as domain metadata 404 and domain functions 406, respectively), which can be indexed with metadata annotations. A basis set of domain states and functions are said to completely span the functional domain 400—thus, giving metadata access to every state and operation on that functional domain 400. Metadata indexed domain metadata 404 and domain functions 406 enable the construction of new metadata models of programs on that domain (depicted as constructed programs 410 in FIG. 4) as well as enabling the reconstruction of functional domain programs 402 on the functional domain 400.

A metadata script language is required to bring metadata software models to life (that is, to make them executable). A metadata script language may be a declaration specification language that enables the expression and execution of the metadata software models. The metadata script language is oftentimes a specification language and closely resembles that of plain English. In this case, a metadata language may be a cluster of Domain Specific Languages (DSLs) or a cluster of small languages joined together with the same underlying metadata language syntax to enable them to blend and work together.

A metadata-driven software approach simplifies and accelerates software development. The first step of this approach is to identify an appropriate functional domain 400. The next step involves decomposing the functional domain into sets of domain metadata 404 and domain functions 406. In the claimed invention, the domain metadata 404 may be a set of metadata domain APIs and the domain functions 406 may be an appropriate low-level programming language (such as the foreign switch API 266 or the remote metadata-driven switch API 270). Finally, a metadata script language is applied to compose executable metadata program models (the constructed programs 410 and reconstructed programs 408). Additionally, the metadata script language itself may be built using metadata, which means it may have its own language-interpreter or compiler specific metadata annotated and indexed into functional domains.

With regard to the claimed invention, each DSL may implement a different functional domain 400. For example, the metadata-driven switch engine 200 may be constructed of multiple functional domains 400. For example, the DPI feedback 226 block may be one functional domain and the hierarchical metadata controller 216 may be another functional domain. Additionally, each of the different metadata-driven switch models 210 and foreign switch models 208 may each be considered a separate functional domain 400. Finally, each of the virtual secure channels 228 may be treated as a separate functional domain.

From an implementation standpoint, metadata may be implemented as a collection of name-value pairs having type. The name portion may be plain text. The value part may be simple or complex (chosen at the discretion of the programmer). A value can be a basic primitive scalar value, that is: a Boolean, a number, or a text string. Or value can be a record or an object (with more or less internal complexity). A record may also be an n-tuple of named primitive values. Additionally, a value may include lists, arrays, hashes, or graphs of primitive values and/or objects. Or the lists, arrays, hashes, or graphs can hold sub-lists, sub-arrays, or sub-graphs. Or a value can be an additional metadata instance or list, array, hash, or graph of a metadata instance.

A metadata implementation framework must also incorporate bookkeeping information about metadata instances into the metadata structure. Bookkeeping information holds identification index numbers, create and change dates, access controls, ownership, and other informational items. Bookkeeping information is foundational (that is, structural-level) primitive information about metadata that is important to the maintenance and management of the metadata system.

Type is structural metadata about metadata. Type identifies the kind or structure of metadata instances. Since metadata is extendable, type may be extendable to add new metadata type instances as new metadata kinds are added to the metadata system. New metadata kinds are identified and added to the system by adding new metadata types. A type must identify the kind of value that a metadata instance holds and the domain to which a metadata instance belongs. An index of types will annotate all the domains and value types in the metadata system.

At the system level, a metadata instance is an object or record that holds bookkeeping information, a type metadata reference, a name, and a value. An object is essentially a record with added methods (ignoring the object compositional potential of objects—objects may be composed from other objects in a 'has' compositional relationship in addition to the more advertised 'is-a' inheritance relationship).

Finally, the set of states, functions, processes for any domain or functional domain 400 may be extended at any time with new metadata describing a new state, function, or process without disrupting older metadata software models. This establishes an accretion model for software development where any previously reconstructed program 408 or constructed program 410 is compatible with newly reconstructed programs 408 and constructed programs 410.

Figure 5:
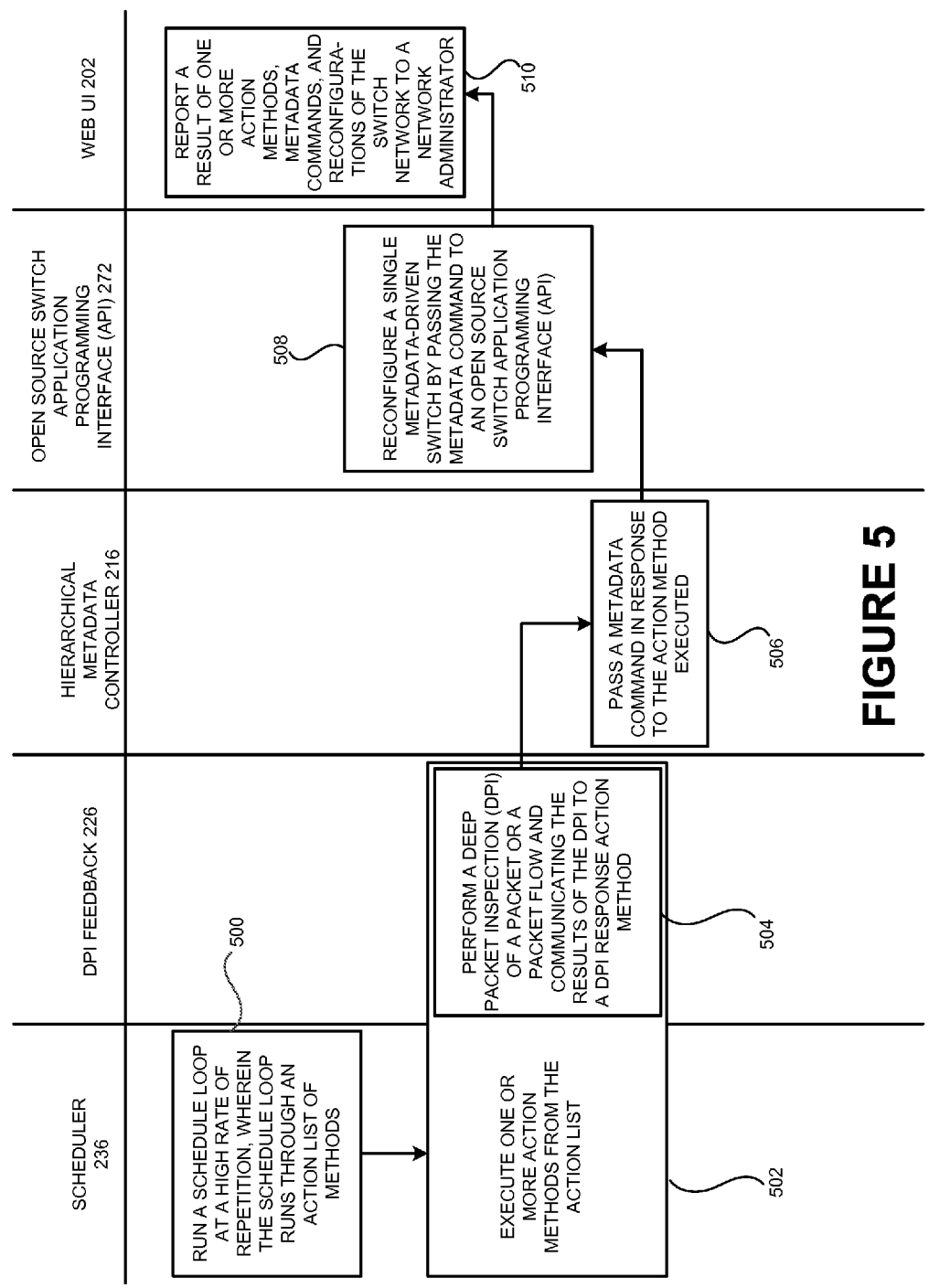
FIG. 5 is a process flow diagram illustrating the method of controlling a switch network using the metadata-driven switch of FIG. 1.

Reference is now made to FIG. 5, which is a process flow diagram illustrating the method of controlling a switch network 118 using the metadata-driven switch 100 of FIG. 1. Specifically, operation 500 involves running a schedule loop at a high rate of repetition, wherein the schedule loop runs through an action list of methods. Operation 502 involves executing one or more action methods from the action list. Sub-operation 504 of operation 502 involves performing a deep packet inspection (DPI) of a packet or a packet flow and communicating the results of the DPI to a DPI response action method. Operation 506 involves passing a metadata command in response to the action method executed to a hierarchical metadata controller 216. Operation 508 involves reconfiguring a single metadata-driven switch 100 by passing the metadata command to an open source switch application programming interface (API) such as the OpenFlow API. Operation 510 involves reporting a result of one or more action methods, metadata commands, and reconfigurations of the switch network to a network administrator 302.

Figure 6:
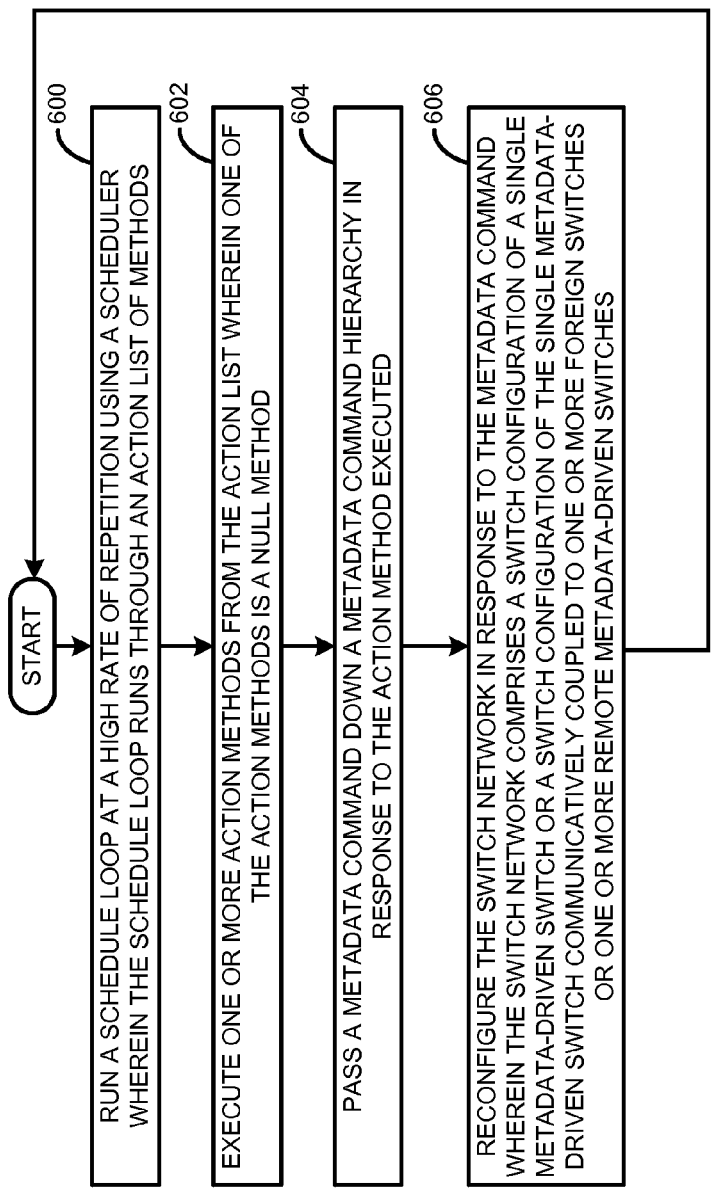
FIG. 6 is a simplified process flow diagram illustrating the method of controlling a switch network using the metadata-driven switch of FIG. 1.

Reference is now made to FIG. 6, which is a simplified process flow diagram illustrating the method of controlling a switch network 118 using the metadata-driven switch 100 of FIG. 1. Specifically, operation 600 involves running a schedule loop at a high rate of repetition using a scheduler wherein the schedule loop runs through an action list of methods. Operation 602 involves executing one or more action methods from the action list wherein one of the action methods is a null method. Operation 604 involves passing a metadata command 218 down a metadata command hierarchy in response to the action method executed. Operation 606 involves reconfiguring the switch network in response to the metadata command wherein the switch network 118 comprises a switch configuration of the single metadata-driven switch 100 communicatively coupled to one or more foreign switches 264 or one or more remote metadata-driven switches 268.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A machine-implemented method to automatically and continuously control a switch network using metadata, comprising:
   running a schedule loop at a high rate of repetition using a scheduler, wherein the schedule loop runs through an action list of methods and the action list comprises one or more static action methods, dynamic action methods, virtual secure channel methods, DPI response action methods, and remote metadata-driven switch action methods;
   executing one or more action methods from the action list, wherein one of the action methods is a null method;
   performing a deep packet inspection (DPI) of a packet or a packet flow and communicating the results of the DPI to the DPI response action method in order to generate a metadata command;
   passing the metadata command down a metadata command hierarchy in response to the action method executed; and
   reconfiguring the switch network in response to the metadata command, wherein the switch network comprises a switch configuration of a single metadata-driven switch, or a switch configuration of the single metadata-driven switch communicatively coupled to one or more foreign switches or one or more remote metadata-driven switches.

2. The method of claim 1, wherein the DPI is performed on one or more off load engines and wherein at least one of the off load engines is coupled to a switch silicon communicatively coupled to the switch network.

3. The method of claim 1, further comprising:
   passing the metadata command down the metadata command hierarchy through a hierarchical metadata controller executable on one or more off load engines of the single metadata-driven switch.

4. The method of claim 3, wherein the metadata command hierarchy is a series of expanding command structures and the hierarchical metadata controller receives the action from the action list at a command structure other than a top level command structure.

5. The method of claim 4, wherein the series of expanding command structures has direct access to one or more metadata switch models of the single metadata-driven switch, one or more metadata network models of the plurality of switches, one or more foreign switch models, and one or more ad-hoc settings.

6. The method of claim 1, further comprising:
   reconfiguring the single metadata-driven switch by passing the metadata command to an open source switch application programming interface (API);
   reconfiguring one or more remote metadata-driven switches communicatively coupled to the single metadata-driven switch by passing the metadata command to a remote metadata-driven switch API; and
   reconfiguring one or more foreign switches communicatively coupled to the single metadata-driven switch by passing the metadata command to a foreign switch API.

7. The method of claim 6, further comprising:
   reconfiguring the foreign switch or the remote metadata-driven switch communicatively coupled to the switch network through a virtual secure channel.

8. The method of claim 1, further comprising:
   delivering a complete copy of a pre-existing switch environment to a new metadata-driven switch added to the switch network through a metadata-driven switch-to-switch protocol.

9. The method of claim 1, further comprising:
   reporting a result of one or more action methods, metadata commands, and reconfigurations of the switch network to a network administrator through a web user interface.

10. A switch system, comprising:
    a single metadata-driven switch and a plurality of switches, wherein the plurality of switches comprise one or more foreign switches or one or more remote metadata-driven switches;
    a plurality of off load engines and processors embedded in the single metadata-driven switch;
    a plurality of storage devices communicatively coupled to the plurality of off load engines and processors;
    a plurality of programs, wherein the plurality of programs are stored in the plurality of storage devices and executable by the plurality of off load engines or processors, with at least one of the plurality of programs comprising:
       instructions to run a schedule loop at a high rate of repetition using a scheduler, wherein the schedule loop runs through an action list of methods and the action list comprises one or more static action methods, dynamic action methods, virtual secure channel methods, DPI response action methods, and remote metadata-driven switch action methods;
       instructions to execute one or more action methods from the action list, wherein one of the action methods is a null method;
       instructions to perform a deep packet inspection (DPI) of a packet or a packet flow and communicate the results of the DPI to the DPI response action method;
       instructions to pass a metadata command down a metadata command hierarchy in response to the action method executed; and
       instructions to reconfigure a switch network in response to the metadata command, wherein the switch network comprises a switch configuration of the single metadata-driven switch, or a switch configuration of the single metadata-driven switch communicatively coupled to one or more foreign switches or one or more remote metadata-driven switches.

11. The switch system of claim 10, wherein the DPI is performed on one or more off load engines and wherein at least one of the off load engines is coupled to a switch silicon communicatively coupled to the switch network.

12. The switch system of claim 10, further comprising:
    instructions to pass the metadata command down the metadata command hierarchy through a hierarchical metadata controller executable on one or more off load engines of the single metadata-driven switch.

13. The switch system of claim 12, wherein the metadata command hierarchy is a series of expanding command structures and the hierarchical metadata controller receives the action from the action list at a command structure other than a top level command structure.

14. The switch system of claim 13, wherein the series of expanding command structures has direct access to one or more metadata switch models of the single metadata-driven switch, one or more metadata network models of the plurality of switches, one or more foreign switch models, and one or more ad-hoc settings.

15. The switch system of claim 10, further comprising:
instructions to reconfigure the single metadata-driven switch by passing the metadata command to an open source switch application programming interface (API);
instructions to reconfigure one or more remote metadata-driven communicatively coupled to the single metadata-driven switch by passing the metadata command to a remote metadata-driven switch API; and
instructions to reconfigure one or more foreign switches communicatively coupled to the single metadata-driven switch by passing the metadata command to a foreign switch API.

16. The switch system of claim 15, further comprising:
instructions to reconfigure the foreign switch or the remote metadata-driven switch communicatively coupled to the switch network through a virtual secure channel.

17. The switch system of claim 10, further comprising:
instructions to deliver a complete copy of a pre-existing switch environment to a new metadata-driven switch added to the switch network through a switch-to-switch protocol.

18. The switch system of claim 10, further comprising:
instructions to report a result of one or more action methods, metadata commands, and reconfigurations of the switch network to a network administrator through a web user interface.

* * * * *